United States Patent [19]
Mosher et al.

[11] Patent Number: 5,735,538
[45] Date of Patent: Apr. 7, 1998

[54] BRAKE DRUM DOLLY

[75] Inventors: Charles L. Mosher; Gerald E. Barry, both of Owatonna; Anthony M. Thompson, Faribault, all of Minn.

[73] Assignee: OTC Division of SPX Corporation, Owatonna, Minn.

[21] Appl. No.: 582,233

[22] Filed: Jan. 3, 1996

Related U.S. Application Data

[63] Continuation of Ser. No. 197,503, Feb. 16, 1994, abandoned.

[51] Int. Cl.$^6$ ........................................ B62B 1/00
[52] U.S. Cl. ..................... 280/47.24; 280/79.4; 414/427
[58] Field of Search ..................... 280/79.4, 79.6, 280/47.18, 47.221; 414/426, 427, 490; 248/669; 254/8 R, 8 B; 27/273

[56] References Cited

U.S. PATENT DOCUMENTS

| | | | |
|---|---|---|---|
| 772,883 | 10/1904 | Hines | 280/47.24 |
| 981,329 | 1/1911 | Thornburg | 254/8 R |
| 2,516,260 | 7/1950 | Schildmeier | 280/79.4 |
| 2,858,139 | 10/1958 | Riuette | 280/43.2 |
| 2,893,019 | 7/1959 | Renfroe et al. | 280/43.2 |
| 3,815,767 | 6/1974 | Lund et al. | 280/47.12 |
| 4,741,659 | 5/1988 | Berg | 414/490 |
| 4,865,339 | 9/1989 | Rundborg et al. | 414/490 |
| 5,007,789 | 4/1991 | Painter | 414/426 |
| 5,181,821 | 1/1993 | King | 414/427 |
| 5,378,004 | 1/1995 | Gunlock et al. | 280/79.4 |

FOREIGN PATENT DOCUMENTS

| | | | |
|---|---|---|---|
| 730169 | 8/1932 | France | 280/47.18 |
| 470701 | 1/1929 | Germany | 254/8 R |
| 121468 | of 1971 | Norway | 254/8 R |
| 342475 | 12/1959 | Switzerland | 280/47.24 |
| 8910273 | 11/1989 | WIPO | 414/426 |

*Primary Examiner*—Kevin Hurley
*Assistant Examiner*—Min Yu
*Attorney, Agent, or Firm*—Wood, Phillips, VanSanten, Clark & Mortimer

[57] ABSTRACT

A dolly is provided for facilitating removal and installation of brake drums on vehicles. The dolly includes a frame having a cradle portion for supporting a brake drum. Wheels are rotatably mounted on the frame for moving the frame over a support surface into position beneath a brake drum. A handle projects from the frame for manually manipulating the frame into and out of position relative to the brake drum. An elevating linkage is provided for raising and lowering the frame relative to the wheels to lift and lower the brake drum relative to the vehicle.

10 Claims, 2 Drawing Sheets

U.S. Patent  Apr. 7, 1998  Sheet 1 of 2  5,735,538
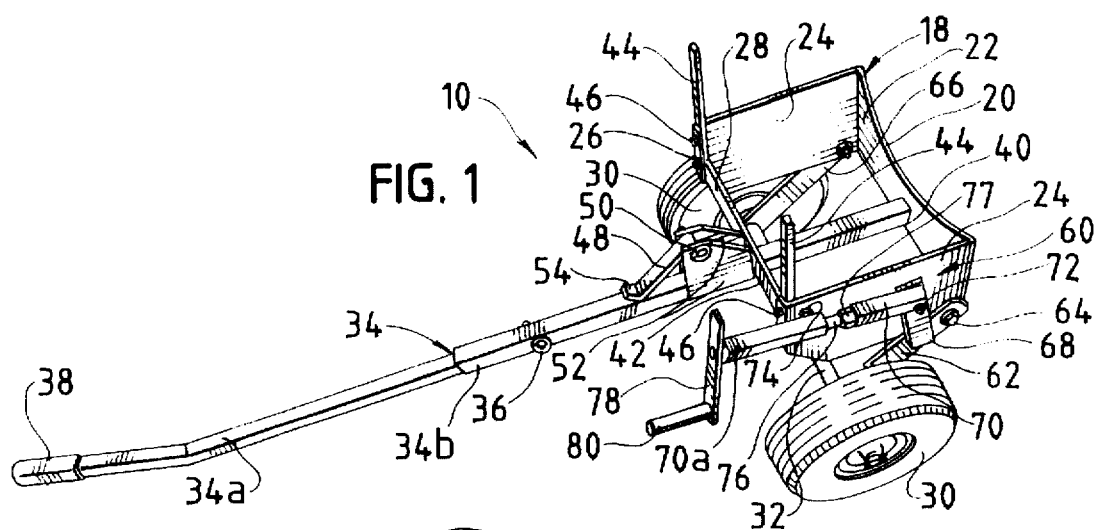
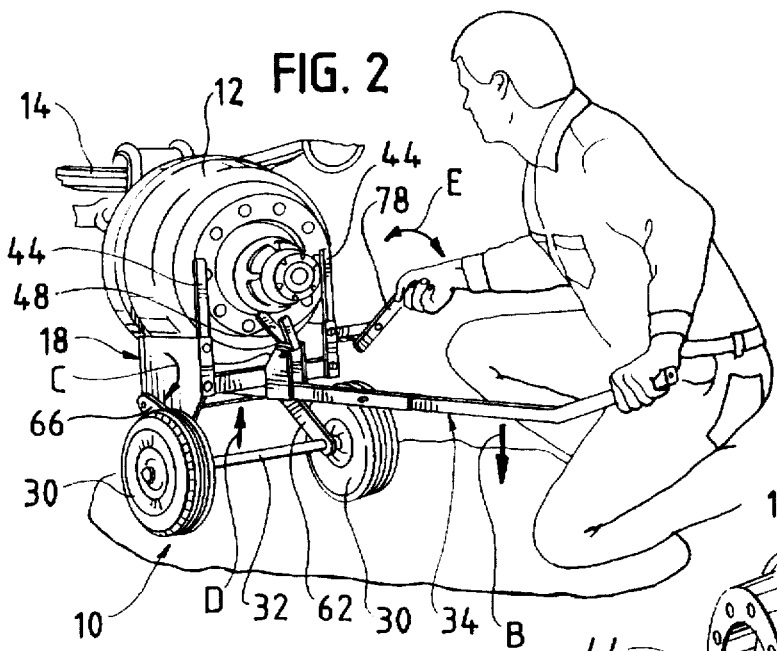
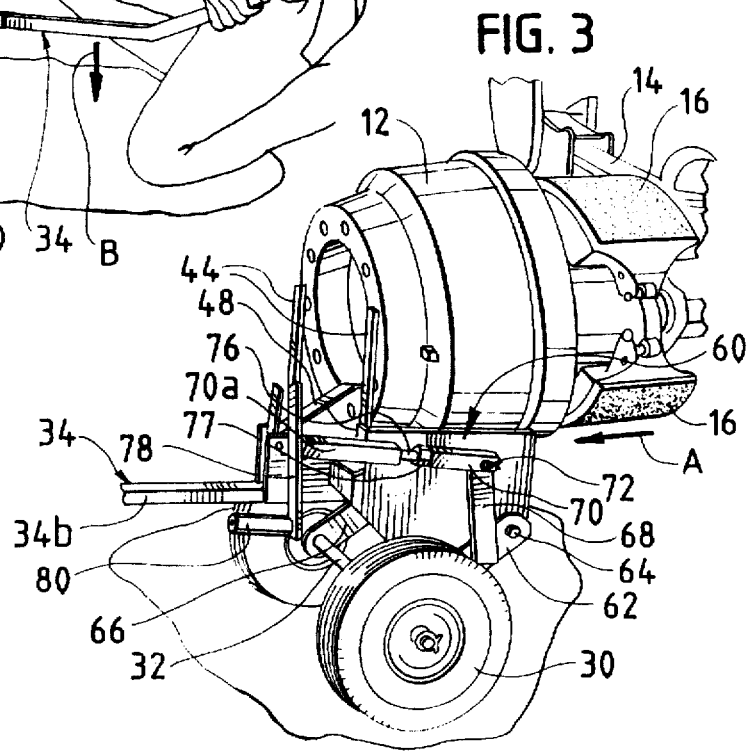

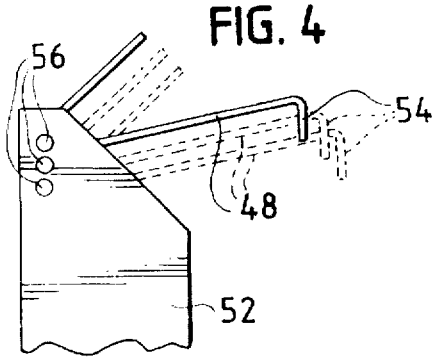
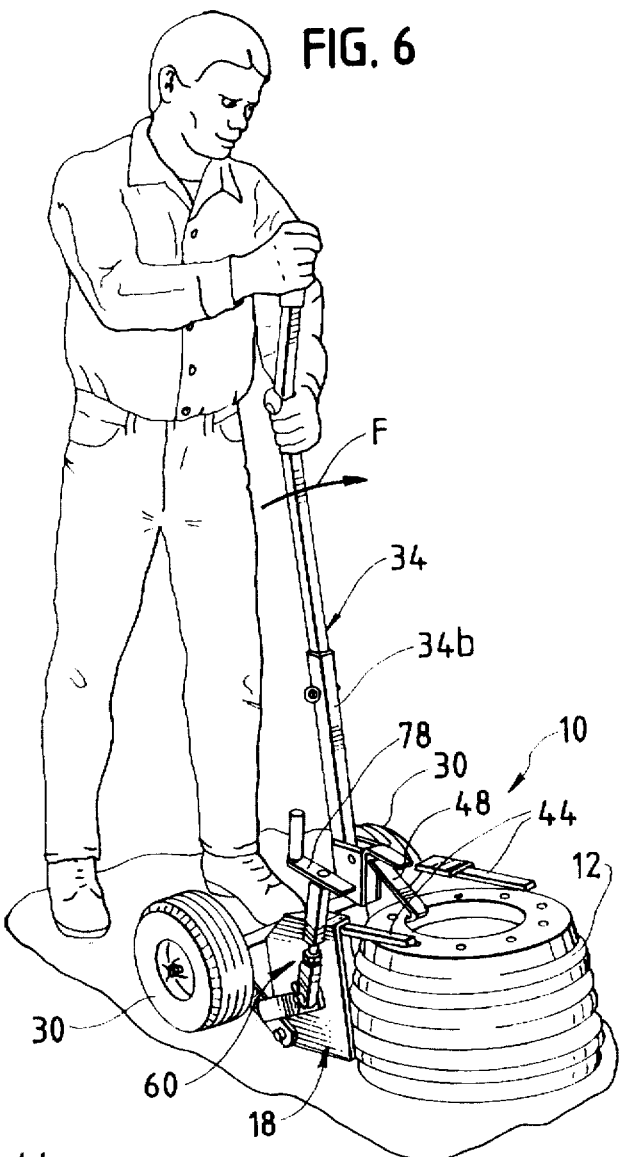
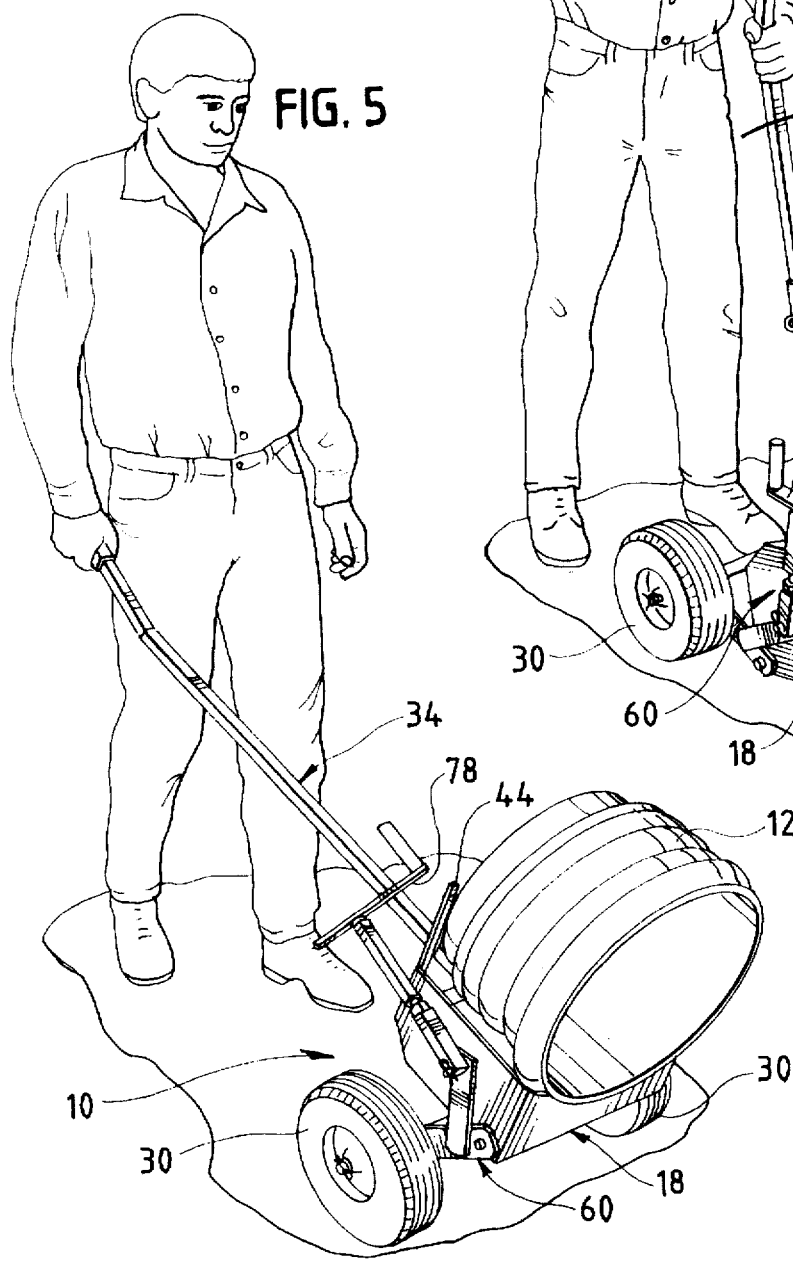

BRAKE DRUM DOLLY

SPECIFICATION

This application is a continuation of application Ser. No. 08/197,503, filed Feb. 16, 1994, abandoned.

FIELD OF THE INVENTION

This invention relates to a dolly particularly adapted for facilitating removal and installation of brake drums on vehicles.

BACKGROUND OF THE INVENTION

It is very difficult to handle outboard brake drums on trucks and trailers in order to service or replace the drums or to perform service on the brakes and associated parts. Heretofore, the most common procedure in removing and installing brake drums has been by manual manipulation. This is extremely difficult and dirty work and is prone to cause injuries, including serious back injuries. These operations have caused a considerable amount of lost-time as well as workman's compensation claims for a shop proprietor.

Outboard brake drums, such as used on large trucks, can weight as much as 120 pounds each. They are very awkward to grasp and handle; they are positioned at a height that requires a person to stoop or bend; and they frequently are positioned beneath an overhead obstruction, such as a truck or trailer bed.

Overhead lifts, hoists or cranes might be considered a logical solution to these problems. However, it must be understood that vertical access to the brake drums often is difficult or impossible because of the overhead obstructions. In addition, such implements are prone to scratch or damage portions of the vehicle itself.

The present invention is directed to solving these problems by providing a very efficient, simple to operate and cost effective dolly which can be used by an operator. In fact, the dolly is readily operable by an operator's two hands and actually can be manipulated over a supporting surface with a single hand.

SUMMARY OF THE INVENTION

An object, therefore, of the invention is to provide a simple, efficient and cost-effective dolly for facilitating removal and installation of brake drums on vehicles.

In the exemplary embodiment of the invention, the dolly includes a frame having a cradle portion for supporting a brake drum. Wheels are rotatably mounted on the frame for moving the frame over a support surface, such as a floor, including into a position beneath the brake drum. A handle projects from the frame for manually manipulating the frame including into and out of said position. Elevating means are provided for raising and lowering the frame relative to the wheels to lift and lower the brake drum relative to the vehicle.

As disclosed herein, the cradle portion is concave generally in a curvature complementary to that of the brake drum. The frame includes stop means for abutting against an outside surface of the brake drum to facilitate defining the position of the frame beneath the brake drum. Latch means are movably mounted on the frame for latching engagement with the brake drum to hold the drum in the cradle portion of the frame.

A feature of the invention is to mount the wheel means on axle means below the frame, with the handle being elongated and connected to the frame on an axis spaced above the axle means. Therefore, the frame can be tilted about the axle means by raising and lowering the handle. In fact, the cradle portion of the frame is located forwardly of the wheel axle means to amplify this tilting movement.

As disclosed herein, the elevating means is a toggle linkage connected between the wheels and the frame. The linkage includes a first link arm pivotally connected at one end thereof to the axle means and an opposite end thereof to the frame. A second link arm is pivotally connected at one end thereof to the first link arm intermediate the ends thereof. A third link arm is pivotally connected to the second link arm spaced from the one end thereof. The third link arm is pivotally connected to the frame at a location spaced from its point of connection to the second link arm. The third link arm is extendable to effect relative pivoting of the second and first link arms and, thereby, movement of the axle means relative to the frame. In the preferred embodiment, the third link arm is provided as a turnbuckle type member to effect extending or retracting the third link arm. A manually rotatable crank is operatively associated with the turnbuckle member.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is an overhead perspective view of the dolly of the invention, as the wheels and handle would be resting on a support surface such as a floor;

FIG. 2 shows an operator having moved the dolly in position beneath a brake drum of a vehicle, with the operator manually manipulating the elevating means;

FIG. 3 is a side elevational view of the frame of the dolly in position beneath the brake drum;

FIG. 4 is a fragmented side elevational view of the latch means in various positions;

FIG. 5 shows the operator using the dolly to transport the brake drum over the support surface; and FIG. 6 shows the operator tilting the handle of the dolly upward to deposit the brake drum onto the support surface or floor.

DETAILED DESCRIPTION OF THE PREFERRED EMBODIMENT

Referring to the drawings in greater detail, the invention is embodied in a dolly, generally designated 10, for facilitating removal and installation of a brake drum 12 on a vehicle. Although the dolly has a wide range of applications, the dolly is particularly applicable for removing and installing brake drums on trucks and trailers wherein the drums may weigh as much as 120 pounds each. FIG. 1 shows the dolly simply resting on a support surface such as a floor. FIG. 2 shows an operator having moved the dolly in position beneath the brake drum which is still mounted on the vehicle outboard of springs 14 of the vehicle. FIG. 3 shows the dolly having moved the brake drum away from the vehicle in the direction of arrow "A" and off of brake pads 16.

More particularly, dolly 10 includes a frame, generally designated 18 and including a forward cradle portion defined by a concave upper edge 20 of a front wall 22 of the frame. The frame may be fabricated of metal material, and front wall 22 is integrally joined to side walls 24 which, in turn, are connected by appropriate fastening means 26 to a rear cross brace 28. A pair of wheels 30 are rotatably mounted on an axle 32 running transversely beneath and spaced below the frame. The wheels are effective for moving the frame over a floor and into and out of a position beneath the brake drum as described above in relation to FIGS. 2 and 3.

An elongated handle, generally designated 34, projects rearwardly of frame 18 for manually manipulating the frame over the floor and into and out of position relative to the brake drum. The handle is a telescoping shaft-like member and includes an outer handle portion 34a telescoped within an inner handle portion 34b. The length of the handle is adjustable by providing a plurality of axially spaced holes (not visible in the drawings) for receiving a pin 36 extending through the telescoped handle portions. A plastic grip 38 may be provided on the outer distal end of the handle. The extreme opposite end of the handle is fixed, as at 40, to front wall 22 of frame 18, as by welding. The handle also is fixed to brace 28 of the frame, as at 42.

Stop means are provided in the form of a pair of upwardly projecting arms 44 fixed by appropriate fastening means 46. The stop arms abut against an outside surface of brake drum 12, as best seen in FIGS. 2 and 3, and effectively define the position of frame 18 beneath the brake drum.

A latch arm 48 is pivotally mounted on a pin 50 extending between a pair of bracket plates 52 fixed between inner handle portion 34b and frame brace 28, as by welding. The latch arm has a hook portion 54 on the distal end thereof. As seen best in FIG. 3, the latch arm is pivoted to a position wherein the hook portion latches inside the brake drum to hold the brake drum on frame 18 within cradle 20 thereof. FIG. 4 shows that latch arm 48 can be located at different positions to accommodate different sizes of brake drums simply by positioning pin 50 (FIG. 1) through one of a plurality of holes 56 in bracket plates 52.

Another feature of the invention is the provision of elevating means, generally designated 60, for raising and lowering frame 18 relative to wheels 30 (i.e. the floor) to lift and lower the brake drum relative to the vehicle. More particularly, elevating means 60 is provided in the form of a toggle linkage between the wheels and the frame. The linkage includes a first link arm 62 pivotally connected at one end thereof to axle 32 and an opposite end 64 thereof to one of the side walls 24 of frame 18. At this point, it should be understood that, while only one elevating linkage 60 is provided at the right-hand side of frame 18, a link arm 66 similar to first link arm 62 is provided at the opposite side of the frame between axle 32 and the side wall 24 of the frame, as is clearly seen in FIG. 1. Therefore, link arms 62 and 66 effectively allow frame 18 to move up and down relative to wheels 30 and the supporting floor.

Elevating linkage 60 also includes a second link arm 68 pivotally connected at one end to first link arm 62 intermediate the ends of the first link arm. A third link arm 70 is pivotally connected to second link arm 68 at a pivot point 72 spaced from the pivot connection between the first and second link arms. The third link arm is pivotally connected, as at 74, to side wall 24 of the frame at a location spaced from pivot point 72 between the third link arm and the second link arm. Generally, third link arm 70 is extendable to effect relative pivoting of second and first link arms 68 and 62, respectively, to effectively raise and lower frame 18 relative to axle 32 and wheels 30.

More particularly, third link arm 70 is provided in the form of a turnbuckle type member having an outer portion 70a pivoted to side wall 24, at 74. A threaded post 76 extends through outer portion 70a of the third link arm and is threaded into a nut 77 integral with arm 70. A manually rotatable crank 78 having a handle portion 80 is fixed to threaded post 76 outside the outer portion 70a. Therefore, as the crank is rotated, threaded post 76 is rotated to move third link arm 70 axially and thereby effect rotation of second and first link arms 68 and 62, respectively.

The operation and manner of using dolly 10 now will be described. Referring first to FIG. 2, it can be seen that the operator has wheeled dolly 10 to a location for positioning frame 18 beneath brake drum 12. It can be seen clearly in this depiction that handle 34 is connected to the frame spaced above axle 32. In addition, as seen in FIG. 3, the entire frame is located forwardly of the axle. Therefore, the operator can effect some degree of raising and lowering of the frame simply by raising and lowering the handle. In other words, referring to FIG. 2, by pressing down on handle 34 in the direction of arrow "B", the frame will rotate about axle 32 in the direction of arrow "C" and cause the front of the frame (i.e. cradle edge 20 in FIG. 1) to elevate in the direction of arrow "D". If the frame still is not in a proper elevated position for movement beneath the brake drum, the operator rotates crank 78 in one direction or the other as indicated by double-headed arrow "E" to operate elevating linkage 60 (FIG. 1).

Once the operator has properly positioned frame 18 beneath brake drum 12, such as having stop arms 44 abut against the outside surface of the brake drum, the operator will effect a final degree of lifting to free the brake drum for movement of the drum axially off of brake pads 16 in the direction of arrow "A" (FIG. 3). It can be seen in FIG. 2 that the operator can effect two different types of lifting (or lowering) actions by either of his or her hands. It can be seen that the operator's right hand is manually manipulating crank 78 while the left hand is gripping handle 34. In actual practice, an operator may use elevating linkage 60 and crank arm 78 to vertically located frame 18 for easy positioning beneath the brake drum, and then use handle 34 to effect the actual final lifting of the brake drum itself, because of the considerable strength of the handle and its simple lever-type mechanical advantage.

Once the brake drum is moved off of its brake pads in the direction of arrow "A" as indicated in FIG. 3, the operator then can transport the brake drum to another work station as indicated in FIG. 5. Once at the work station, the operator simply rotates handle 34 upwardly in the direction of arrow "F" (FIG. 6) to deposit the brake drum onto the floor. It can be seen in FIG. 6 that latch arm 48 will prevent the brake drum from dropping onto the floor before being gently lowered thereon. At the work station, appropriate hoists can be used for effecting whatever repairs are to be performed on the brake drum.

Whereas FIG. 1 shows dolly 10 with handle 34 resting on the floor, FIG. 6 shows that the dolly can also be positioned in an upright position with frame 18 resting on the floor. This upright position is advantageous to store the dolly in an out-of-the-way location, taking up minimal floor storage space.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A dolly for facilitating removal and installation of brake drums on vehicles, comprising:

a frame including a cradle portion for supporting a brake drum wheel means rotatably mounted on the frame for moving the frame over a support surface including into position beneath a brake drum;

handle means projecting from the frame for manually manipulating the frame including into and out of said position; and elevating means comprising a linkage between the wheel means and the frame for raising and lowering the frame relative to the wheel means to lift and lower the brake drum relative to the vehicle, wherein said wheel means are rotatable about a generally horizontal axle means, and said linkage includes a first link arm pivotally connected at one end thereof to the axle means and an opposite end thereof to the frame, a second link arm pivotally connected at one end thereof to the first link arm intermediate the ends thereof, a third link arm pivotally connected to the second link arm spaced from said one end thereof, the third link arm being pivotally connected to the frame at a location spaced from a point of connection of the third link arm to the second link arm, and the third link arm being extendable to effect relative pivoting of the second and first link arms and, thereby, movement of the axle means relative to the frame.

2. The dolly of claim 1 wherein said third link arm comprises a turnbuckle member.

3. The dolly of claim 2, including a manually rotatable crank operatively associated with the turnbuckle member.

4. A dolly for facilitating removal and installation of brake drums on vehicles, comprising:

a frame for supporting a brake drum;

wheel means rotatably mounted on the frame for moving the frame over a support surface including into position beneath a brake drum; and an elevating linkage for raising and lowering the frame relative to the wheel means to lift and lower the brake drum relative to the vehicle, wherein said wheel means are rotatable about generally horizontal axle means, and said linkage includes a first link arm pivotally connected at one end thereof to the axle means and an opposite end thereof to the frame, a second link arm pivotally connected at one end thereof to the first link arm intermediate the ends thereof, a third link arm pivotally connected to the second link arm spaced from said one end thereof, the third link arm being pivotally connected to the frame at a location spaced from a point of connection of the third link arm to the steering link arm, and the third link arm being extendable to effect relative pivoting of the second and first link arms and, thereby, movement of the axle means relative to the frame.

5. The dolly of claim 4, including a manually rotatable crank operatively associated with said linkage.

6. The dolly of claim 4 wherein said frame includes stop means for abutting against an outside surface of the brake drum to facilitate defining position of the frame beneath the brake drum.

7. The dolly of claim 4 wherein said third link arm comprises a turnbuckle member.

8. The dolly of claim 7, including a manually rotatable crank operatively associated with the turnbuckle member.

9. A dolly for facilitating removal and installation of brake drums on vehicles, comprising:

a frame for supporting a brake drum;

wheel means having an axle and being rotatably mounted relative to the frame for moving the frame over a support surface including into position beneath a brake drum;

handle means projecting from the frame for manually manipulating the frame including into and out of said position and for pivoting the frame about the axle; and elevating means for moving the frame relative to the wheel means between raised and lowered positions, the elevating means comprising a linkage pivotally attached to the wheel means and pivotally attached to the frame, the elevating means further comprising control means including a turnbuckle member for rotating the linkage between first and second angular positions with respect to a fixed reference axis, said first and second angular positions corresponding respectively to said raised and lowered positions, and a latch arm pivotally mounted on the frame and having a hook portion on a distal end thereof for latching engagement with a brake drum to hold a brake drum in the frame.

10. A dolly for facilitating removal and installation of brake drums on vehicles, comprising:

a frame for supporting a brake drum;

wheel means having an axle being rotatably mounted relative to the frame for moving the frame over a support surface including into a position beneath a brake drum;

handle means projecting from the frame for manually manipulating the frame including into and out of said position and for angularly pivoting the frame about the axle;

an elevating means for moving the frame relative to the wheel means between raised and lowered positions, the elevating means comprising a linkage pivotally attached to the wheel means and pivotally attached to the frame, the elevating means further comprising control means including a turnbuckle element for rotating the linkage between first and second angular positions with respect to a fixed reference axis, said first and second angular positions corresponding respectively to said raised and lowered positions, and a latch arm pivotally mounted on the frame and having a hook portion on a distal end thereof for latching engagement with a brake drum to hold a brake drum in the frame.

* * * * *